United States Patent
Choi

(10) Patent No.: US 6,260,810 B1
(45) Date of Patent: Jul. 17, 2001

(54) SPRINKLER MOUNTING DEVICE

(75) Inventor: Jin Lim Choi, Seoul (KR)

(73) Assignee: Dong-A Flexible Metal Tubes Co., Ltd., Seoul (KR)

( * ) Notice: Subject to any disclaimer, the term of this patent is extended or adjusted under 35 U.S.C. 154(b) by 0 days.

(21) Appl. No.: 09/627,153

(22) Filed: Jul. 27, 2000

(30) Foreign Application Priority Data

Aug. 16, 1999 (KR) .................................... 99/16852

(51) Int. Cl.[7] ........................................ F16L 3/08
(52) U.S. Cl. .............................. 248/65; 248/72; 248/343; 248/534; 248/317; 52/712; 52/715; 52/506.07
(58) Field of Search .................................... 248/317, 343, 248/72, 48.1, 65, 534, 74.1, 68.1, 58, 59, 62; 52/712, 715, 506.07

(56) References Cited

U.S. PATENT DOCUMENTS

| 2,375,513 | * | 5/1945 | Bach | 248/72 |
|---|---|---|---|---|
| 3,341,909 | * | 9/1967 | Havener | 248/72 |
| 3,608,857 | * | 9/1971 | Hibbeler | 248/317 |
| 3,612,461 | * | 10/1971 | Brown | 248/317 |
| 3,652,780 | * | 3/1972 | Wilson | 248/72 |
| 3,874,035 | * | 4/1975 | Schuplin | 248/72 |
| 4,135,692 | * | 1/1979 | Ferguson | 248/317 |
| 4,717,099 | * | 1/1988 | Hubbard | 248/57 |
| 4,723,749 | * | 2/1988 | Carraro et al. | 248/317 |
| 5,595,363 | * | 1/1997 | DeLeebeeck | 248/72 |

FOREIGN PATENT DOCUMENTS

| 220680 | * | 2/1910 | (DE) | 248/317 |
|---|---|---|---|---|
| 670887 | * | 1/1939 | (DE) | 248/72 |

* cited by examiner

*Primary Examiner*—Ramon O. Ramirez
*Assistant Examiner*—Kimberly Wood
(74) *Attorney, Agent, or Firm*—Shlesinger, Arkwright & Garvey LLP

(57) ABSTRACT

A device for mounting a sprinkler to a ceiling support rail in a building is disclosed. This device consists of two vertical sidewalls integrated into a U-shaped single structure by a top wall. The two sidewalls are bent inwardly at their lower ends to form clip flanges for gripping the head of the ceiling support rail positioned between the two sidewalls. A first bolt hole is formed at the lower portion of each sidewall. A first locking bolt is threaded into the bolt holes of the two sidewalls so as to tighten the lower portions of the two sidewalls and allow the two sidewalls to firmly grip the ceiling support rail. Each of the two sidewalls also has a notch at its upper portion and seats the reducer support beam in the notch. The top wall has a second bolt hole. A second locking bolt is threaded into the second bolt hole so as to hold the reducer support beam seated in the notches of the two sidewalls.

4 Claims, 3 Drawing Sheets

SPRINKLER MOUNTING DEVICE

BACKGROUND OF THE INVENTION

1. Field of the Invention

The present invention relates to sprinkler mounting devices and, more particularly, to a device for mounting a reducer support beam of a sprinkler to a ceiling support rail in a building.

2. Description of the Prior Art

As well known to those skilled in the art, a plurality of ceiling support rails horizontally extend in parallel to the ceiling in a building to form a ceiling support structure, with a ceiling panel being mounted to the bottoms of the ceiling support rails so as to form a desired ceiling. A plurality of reducer support beams are mounted to the ceiling support rails at desired positions so as to hold the reducers of a sprinkler system in parallel to the ceiling. In such a case, a sprinkler mounting device is used for holding each end of a reducer support beam to a desired ceiling support rail.

A conventional sprinkler mounting device, used for holding each end of a reducer support beam to a desired ceiling support rail, has a U-shaped profile defined by one top wall and two sidewalls. This conventional mounting device is thus provided with a fitting channel between the two sidewalls and is fitted over a desired ceiling support rail at the fitting channel. The conventional sprinkler mounting device may be also provided with a locking projection on at least one sidewall thereof at a lower portion so as to be locked to a ceiling support rail at the fitting projection inserted into a hole of the ceiling support rail. A bolt hole is formed at the top wall. A notch is formed on the mounting device at an upper portion and perpendicularly receives a desired portion of a reducer support beam thereon. In order to mount opposite end portions of a reducer support beam of a sprinkler to desired two ceiling support rails, two sprinkler mounting devices are fitted over desired positions of the two ceiling support rails prior to seating the opposite end portions of the reducer support beam in the notches of the two mounting devices. Therefore, the reducer support beam is primarily mounted to the ceiling support rails by the two mounting devices. Thereafter, a locking bolt is threaded downward into the bolt hole of each mounting device, and so the reducer support beam is biased downward by the locking bolt, thus finally coming into close contact with the lower edges of the notches at its lower surface. The position of the reducer support beam relative to the two mounting devices is thus fixed.

However, such a conventional sprinkler mounting device is problematic in that it has a structural defect undesirably inducing an incomplete engagement between the device and a ceiling support rail. In addition, when the locking bolt for fixing the position of the reducer support beam within the notch is exceedingly tightened, the conventional mounting device may be structurally deformed at positions around its fitting channel and or its notch, thus being easily and unexpectedly loosened even by a small external impact. Another problem experienced in the conventional sprinkler mounting device resides in that it is designed to be limitedly usable with a ceiling support rail having specified size and shape, and so it is necessary for manufacturers or users of such sprinkler mounting devices to separately produce or purchase a variety of mounting devices having different sizes and shapes since marketed ceiling support rails have different sizes and shapes. The conventional sprinkler mounting devices are thus very inconvenient to manufacturers and users.

SUMMARY OF THE INVENTION

Accordingly, the present invention has been made keeping in mind the above problems occurring in the prior art, and an object of the present invention is to provide a sprinkler mounting device, which is designed to firmly mount a reducer support beam of a sprinkler to a ceiling support rail in a building.

Another object of the present invention is to provide a sprinkler mounting device, which is usable for firmly mounting a reducer support beam of a sprinkler to a ceiling support rail in a building regardless of a size or a shape of the ceiling support rail.

A further object of the present invention is to provide a sprinkler mounting device, which is less likely to be deformed even when it is exceedingly tightened by a locking bolt to firmly mount a reducer support beam of a sprinkler to a ceiling support rail in a building.

In order to accomplish the above objects, the present invention provides a device for mounting a sprinkler to a ceiling support rail in a building, comprising two vertical sidewalls integrated together into a U-shaped single structure by a top wall, wherein the two sidewalls are bent inwardly at their lower ends to form clip flanges used for gripping the head of the ceiling support rail positioned between the two sidewalls, with a first bolt hole being formed at the lower portion of each of the two sidewalls and a first locking bolt being threaded into the bolt holes of the two sidewalls so as to tighten the lower portions of the two sidewalls and allow the two sidewalls to firmly grip the ceiling support rail, and a notch being formed at the upper portion of each of the two sidewalls and being used for seating a reducer support beam of the sprinkler therein; and the top wall has a second bolt hole, with a second locking bolt being threaded into the second bolt hole so as to hold the reducer support beam seated in the notches of the two sidewalls.

In the above device, two inward projections are formed on each of the two sidewalls to space the two sidewalls apart from each other by a predetermined gap when the first locking bolt tightens the two sidewalls to each other.

In addition, a reinforcing rib is formed along the edge of the notch of each of the sidewalls.

BRIEF DESCRIPTION OF THE DRAWINGS

The above and other objects, features and other advantageous of the present invention will be more clearly understood from the following detailed description taken in conjunction with the accompanying drawings, in which.

DETAILED DESCRIPTION OF THE INVENTION

Figure 1:
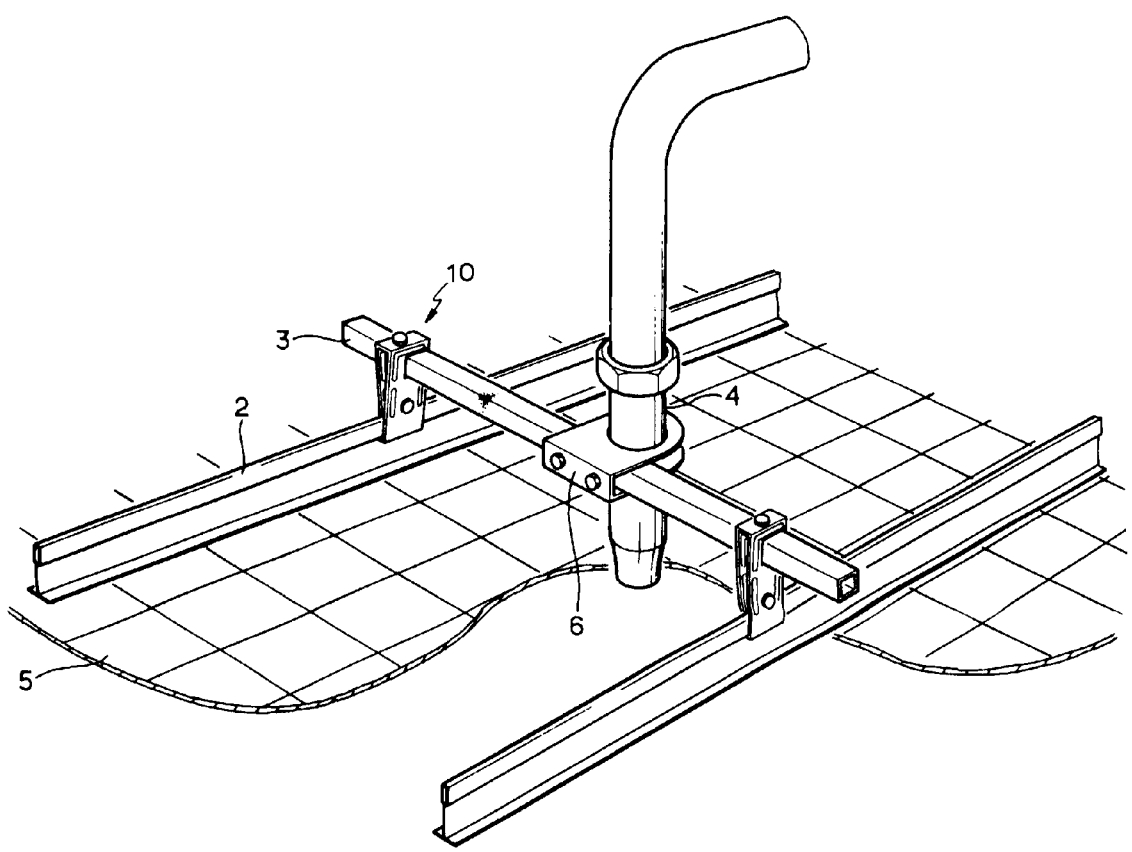
FIG. 1 is a perspective view, showing a reducer support beam of a sprinkler held on two ceiling support rails at its opposite end portions using two mounting devices in accordance with the present invention.

As shown in FIG. 1, a reducer support beam 3 of a sprinkler is held on two ceiling support rails 2 in a building at its opposite end portions using two mounting devices 10 of this invention. A sprinkler reducer 4 is held on the reducer support beam 3 using a fixing bracket 6 mounted to the center of the support beam 3. A ceiling panel 5 is mounted to the bottoms of the ceiling support rails 2 so as to form a desired ceiling.

Figure 2:
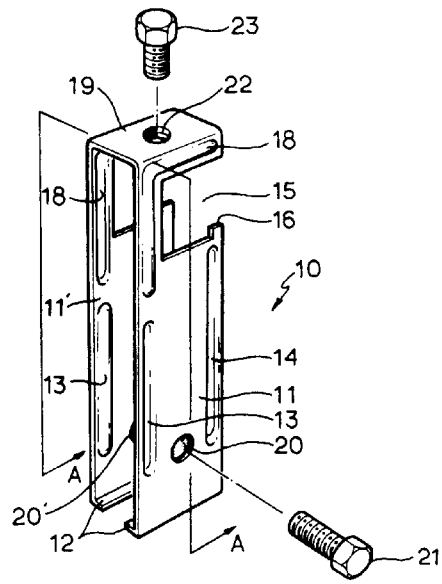
FIG. 2 is a perspective view, showing the construction of a mounting device in accordance with the preferred embodiment of the present invention.
Figure 3:
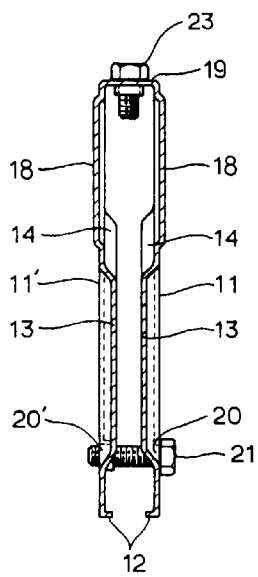
FIG. 3 is a sectional view of the mounting device taken along the line A–A of FIG. 2.

FIGS. 2 and 3 are views, showing the construction of a mounting device 10 in accordance with the preferred embodiment of this invention. As shown in the drawings, the mounting device 10 of this invention comprises two vertical sidewalls 11 and 11' integrated together into a U-shaped single structure by a top wall 19.

The two sidewalls 11 and 11' are bent inwardly at their lower ends to form clip flanges 12, which are used for gripping the head of a ceiling support rail 2 positioned between the two sidewalls 11 and 11'. A first bolt hole 20 or 20' is formed at the lower portion of each of the two sidewalls 11 and 11', while a first locking bolt 21 is threaded into the bolt holes 20 and 20' of the two sidewalls 11 and 11'. In such a case, the locking bolt 21 is threaded in a direction from the bolt hole 20 of the sidewall 11 to the bolt hole 20' of the sidewall 11', with the bolt hole 20' being internally threaded. Therefore, when the locking bolt 21 is threaded into the two bolt holes 20 and 20', the sidewall 11' is biased toward the other sidewall 11, thus reducing the width of the channel between the two sidewalls 11 and 11' at the lower portion.

Figure 4:
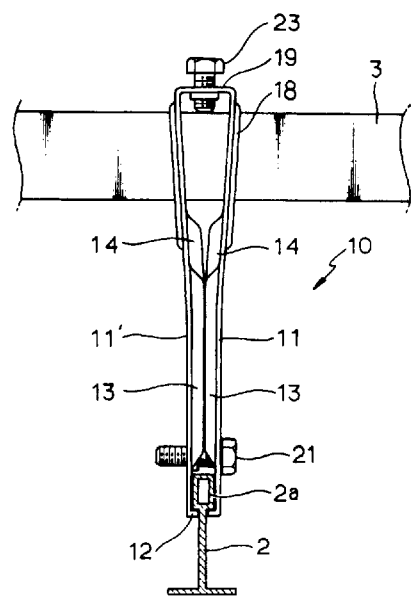
FIG. 4 is a front view of the mounting device of this invention, when the device mounts an end portion of the reducer support beam to a ceiling support rail.
Figure 5:
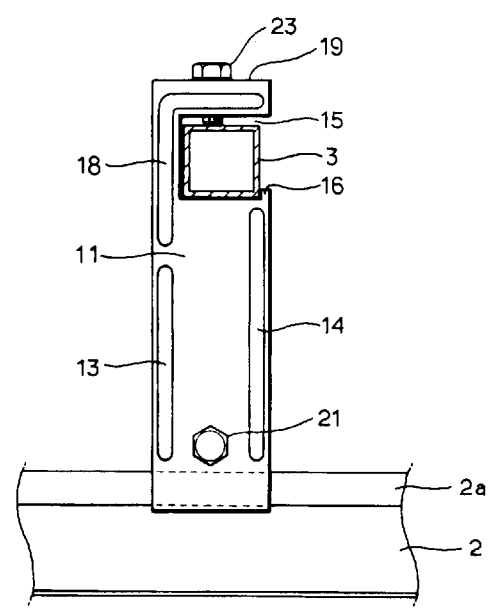
FIG. 5 is a side view of the mounting device of this invention, when the device mounts an end of the reducer support beam to a ceiling support rail.

FIGS. 4 and 5 show the mounting device 10 of this invention, when the device 10 mounts an end portion of the reducer support beam 3 to a ceiling support rail 2. As shown in the drawings, in order to fix the mounting device 10 to a desired position of a ceiling support rail 2, the mounting device 10 is primarily fitted over the ceiling support rail 2 in a way such that the clip flanges 12 of the two sidewalls 11 and 11' are positioned outside the opposite surfaces of the web of the rail 2 at a position under the head 2a of the rail 2. Thereafter, the locking bolt 21 is fully threaded into the two bolt holes 20 and 20', and so the two sidewalls 11 and 11' are reduced in the gap between them at the lower portions and compress the head 2a of the rail 2, thus finally fixing the position of the mounting device 10 on the rail 2.

Two or more inward projections 13 and 14 are formed on the inside surface of each sidewall 11 or 11'. In the preferred embodiment of this invention, the inward projections 13 and 14 are formed by a pressing process, in which the projections 13 and 14 are formed as inward grooves. When the locking bolt 21 is tightened, the inward projections 13 and 14 of the two sidewalls 11 and 11' come into compression contact with each other at their lower portions as best seen in FIG. 4, thus allowing a predetermined gap to be remained between the two sidewalls 11 and 11' even when the locking bolt 21 is fully tightened. Such a gap between the two sidewalls 11 and 11' allows the clip flanges 12 to be prevented from being undesirably opened even when the locking bolt 21 is fully tightened. Therefore, it is possible for the clip flanges 12 to firmly hold the mounting device 10 to the ceiling support rail 2.

That is, when the sidewalls 11 and 11' are not provided with such inward projections 13 and 14, the two sidewalls 11 and 11' are brought into contact with each other at their lower portions in accordance with a tightening action of the locking bolt 21, thus undesirably allowing the clip flanges 12 to be opened due to the head 2a of the rail 2. Such opened clip flanges 12 regrettably fail to firmly grip the web of the rail 2 and fail to firmly hold the mounting device 10 on the rail 2. However, the mounting device 10 of this invention has the inward projections 13 and 14 on each of the sidewalls 11 and 11', thus effectively preventing the clip flanges 12 from being undesirably opened. The mounting device 10 thus overcomes such a problem caused by the opened clip flanges 12. The inward projections 13 and 14, formed through a pressing process, also act as reinforcing ribs for each sidewall 11 or 11'.

A notch 15 is formed at the upper portion of each of the two sidewalls 11 and 11'. This notch 15 is used for seating a desired end portion of the reducer support beam 3 of the sprinkler. A stop lug 16 is formed on the lower edge of the notch 15 of each sidewall 11 or 11' at the mouth of the notch 15. This stop lug 16 prevents an undesired movement of the reducer support beam 3 within the notch 15. Meanwhile, the top wall 19 has a second bolt hole 22, with a second locking bolt 23 being threaded into the second bolt hole 22 so as to hold the reducer support beam 3 seated in the notches 15 of the two sidewalls 11 and 11'. That is, when the locking bolt 23 is threaded downward into the bolt hole 22 of the mounting device 10, the reducer support beam 3 is biased downward by the locking bolt 23, thus finally coming into close contact with the lower edges of the notches 15 at its lower surface. The position of the reducer support beam 3 relative to the two mounting devices 10 is thus fixed.

In addition, a reinforcing rib 18 is formed along an edge of the notch of each of the sidewalls. The reinforcing rib 18 is preferably formed on each sidewall 11 or 11' to be bulged outward. Due to such a specifically designed structure of the reinforcing ribs 18, it is possible to prevent an undesired deformation of the upper portion of the mounting device even when the locking bolt 21 is fully tightened into the holes 20 and 20'.

The sprinkler mounting device 10 of this invention is used as follows:

In order to mount opposite end portions of a reducer support beam 3 of a sprinkler to desired two ceiling support rails 2, two mounting devices 10 are primarily fixed to desired positions of the two ceiling support rails 2. In such a case, each mounting device 10 is fitted over an associated ceiling support rail 2. Thereafter, a locking bolt 21 is fully threaded into the two bolt holes 20 and 20' of each mounting device 10, thus compressing the head 2a of the rail 2 by the two sidewalls 11 and 11' and firmly fixing the position of the mounting device 10 on the rail 2. In such a case, the inward projections 13 and 14 of the sidewalls 11 and 11' come into compression contact with each other, and so the clip flanges 12 are prevented from being undesirably opened even when the locking bolt 21 is fully tightened.

Thereafter, a reducer support beam 3 of the sprinkler is seated in the notches 15 of the two mounting devices 10, and a second locking bolt 23 is fully threaded into the second bolt hole 22 of each mounting device 10. The reducer support beam 3 is thus biased downward and finally comes into close contact with the lower edges of the notches 15 at its lower surface. The position of the reducer support beam 3 relative to the two mounting devices 10 is thus fixed, and so the opposite end portions of the reducer support beam 3 are firmly mounted to desired ceiling support rails 2. In such a case, the reinforcing rib 18 prevents an undesired deformation of the upper portion of the sidewalls 11 and 11' of each mounting device 10.

As described above, the present invention provides a sprinkler mounting device, designed to firmly mount a reducer support beam of a sprinkler to a ceiling support rail in a building. This sprinkler mounting device is also usable for firmly mounting the reducer support beam to any ceiling support rail regardless of the size and shape of the ceiling support rail. In addition, the sprinkler mounting device is less likely to be deformed even when it is exceedingly tightened by a locking bolt to firmly mount the reducer support beam to the ceiling support rail.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A device for mounting a sprinkler to a ceiling support rail in a building, comprising two vertical sidewalls integrated together into a U-shaped single structure by a top wall, wherein the two sidewalls are bent inwardly at their lower ends to form clip flanges used for gripping a head of the ceiling support rail positioned between the two sidewalls, with a first bolt hole being formed at a lower portion of each of the two sidewalls and a first locking bolt being threaded into the bolt holes of the two sidewalls so as to tighten the lower portions of the two sidewalls and allow the two sidewalls to firmly grip the ceiling support rail, and a notch being formed at an upper portion of each of the two sidewalls and being used for seating a reducer support beam of the sprinkler therein; and said top wall has a second bolt hole, with a second locking bolt being threaded into the second bolt hole so as to hold the reducer support beam seated in the notches of the two sidewalls.

2. The device according to claim 1, wherein an inward projection is formed on each of said two sidewalls to space the two sidewalls apart from each other by a predetermined gap when the two sidewalls are tightened to each other by the first locking bolt.

3. The device according to claim 1, wherein a reinforcing rib is formed along an edge of the notch of each of the sidewalls.

4. The device according to any one of claim 1, wherein a stop lug is formed on a lower edge of the notch of each of the sidewalls at a mouth of said notch and is used for preventing an undesired movement of the reducer support beam within the notch.

* * * * *